Feb. 6, 1951 J. R. WIRT 2,540,180
ELECTRODE
Filed Oct. 29, 1949

Inventor
John R. Wirt
by Spencer Hardman & Fehr
his attorneys

Patented Feb. 6, 1951

2,540,180

UNITED STATES PATENT OFFICE 2,540,180

ELECTRODE

John R. Wirt, Anderson, Ind., assignor to General Motors Corporation, Detroit, Mich., a corporation of Delaware Application October 29, 1949, Serial No. 124,283

2 Claims. (Cl. 219—4)

1

This invention relates to the art of electric welding and its object is to provide for uniting two metal parts by spot-welding simultaneously at a plurality of places. To accomplish this object, I provide an electrode having a plurality of work-engaging projections and having a universal joint connection with an electrode support, the joint providing such area of contact between the support and electrode, when forced against the work, that the voltage drop is low in value.

Further objects and advantages of the present invention will be apparent from the following description, reference being had to the accompanying drawing, wherein a preferred embodiment of the present invention is clearly shown.

Figure 1:
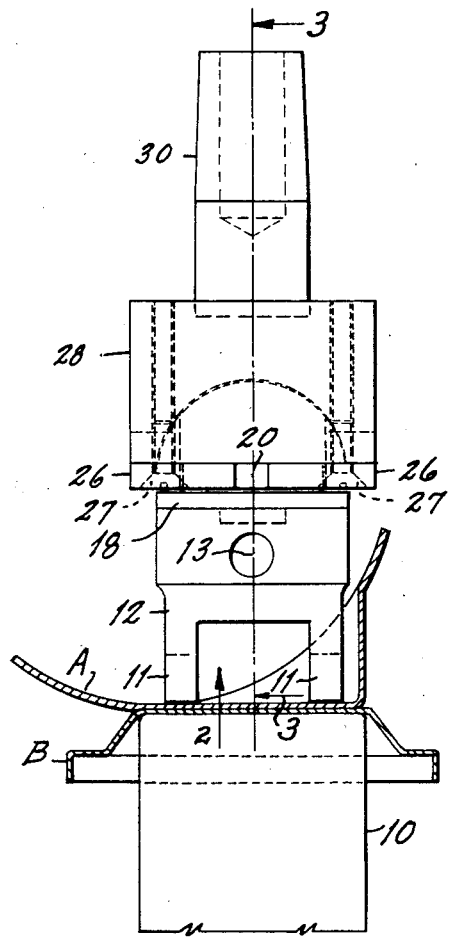
Fig. 1 shows, in section, the work pieces to be united between welding electrodes, the upper one of which is connected with a support by the universal joint embodying the invention.
Figure 2:
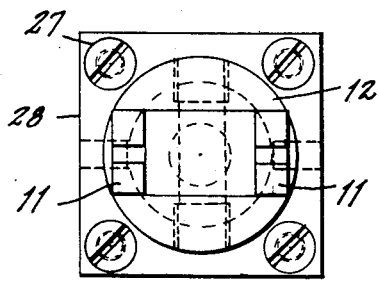
Fig. 2 is a view in the direction of arrow 2 of Fig. 1.
Figure 3:
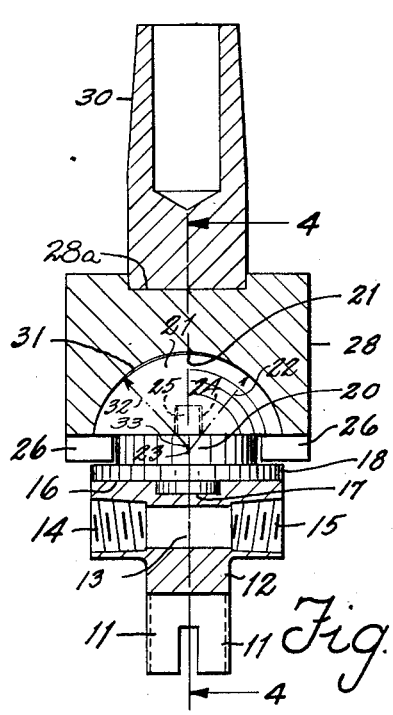
Figure 4:
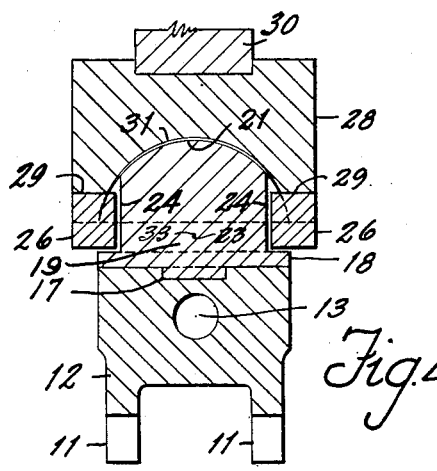

Figs. 3 and 4 are sectional views, respectively, on line 3—3 of Fig. 1 and line 4—4 of Fig. 3.

Referring to Fig. 1, work pieces A and B to be united, are supported by a lower electrode 10 and are spot-welded together by passage of electric current while pressing against the piece A, the projections or feet 11 of an electrode member 12 having a passage 13 connectible with water circulating hoses having threaded connections for engaging tapped holes 14 and 15.

Member 12 has a flat upper surface 16 and a pocket 17 which are united by silver soldering with a disc 18 having a short shank 19. The disc 18 has a portion of reduced diameter to provide an annular groove 20 extending to a spherical portion 21 whose radius is represented by arrow 22 and whose center is represented by point 23. Portion 21 has diametrically opposite notches 24 (Fig. 4) which extend from groove 20. Notches 24 receive lugs 25 (narrower than notches 24 as shown in Fig. 3) of plates 26 which screws 27 attach to a block 28. Plates 26 are less in thickness than the groove 20 which receives them. The lugs 25 of plates 26 are received by diametrically opposite notches 29 (Fig. 4) of block 28. Block 28 has a pocket 28a which receives a shank 30 united with block 28 by silver soldering. Shank 30 is adapted to be attached to a vertically movable electrode carrier of a welding press.

Block 28 has a spherical socket seat 31 for receiving the spherical portion 21 of the disc 18. Seat 31 has the same curvature radius as portion

2

21, its radius being represented by arrow 32 and its center of curvature by point 33 which is below point 23 a slight distance (for example, about .01 inch) when the portion 21 is supported by plate 26.

The plane upper surface of electrode 10 is located at right angles to the direction of movement of the block 28. If the flat surfaces of the parts A and B were exactly plane and of uniform thickness, the upper surface of the flat portion of part A would be exactly parallel to the upper surface of electrode 10. Since parts A and B are not exactly uniform in thickness and are not exactly plane, the feet 11 will tilt slightly to adjust themselves into contact with part A. When the member 12 is lowered into contact with part A, before pressure is applied from block 28, there is lost motion to be taken up. As this lost motion is being taken up, the united parts 12 and 18 shift in a manner such that the feet 11 bear upon the part A with substantially equal pressure due to force of gravity acting on parts 12 and 18. Even after lost motion is taken up between spherical surfaces 21 and 31, still greater equalization of pressure can take place since the force applied by block 28 is all directed to the then coinciding centers of curvature of surfaces 31 and 21 and thence along a force line about which the feet 11 are disposed. Therefore the only force opposing self-adjustment of the feet 11 to the small irregularities of the surface of part A is frictional resistance. It is obvious from Figs. 3 and 4 that member 12 can turn with respect to planes at right angles and, hence, with respect to intermediate planes.

The engagement of notches 24 by lugs 25 (Fig. 3) limits motion of disc 18 rotatively so that the feet 11 are retained in positive relative to the work to be supported by electrode 10. The clearance between notches 24 and lugs 25 contributes to the lost motion which permits self-adjustment of the feet 11 to the work.

Where full pressure is applied through block 28 and disc 18 to the work pieces A and B, the welding current is applied to effect union of the pieces by spot-welding. Since silver soldering provides good electrical connection and because the area of contact between surfaces 31 and 21 is relatively large, the voltage drop between parts 30 and 11 is relatively low.

While the embodiment of the present invention as herein disclosed, constitutes a preferred form, it is to be understood that other forms might be adopted.

What is claimed is as follows:

1. A welding electrode comprising a first member provided with a spherical socket and a second member provided with a spherical part, said second part providing an annular groove and diametrically opposite notches in the spherical part and extending from the groove and parallel to the axis thereof, means for maintaining the members in loosely assembled relation said means including plates attached to the first member and received by the annular groove and less in thickness than the width of the groove and supporting the spherical part with its center of curvature slightly offset from the center of curvature of the surface of the spherical socket, said plates having lugs received by the notches and less in thickness than the width of the notches whereby rotation of the second member relative to the first is limited.

2. A welding electrode comprising, a first member provided with a spherical socket; a second member having a plurality of work-engaging projections at one end and having a spherical head on the other end, said head providing an annular groove and a notch in the head extending from the groove to the spherical surface of the head; plates carried by the first member extending into the annular groove and less in thickness than the width of the groove for loosely retaining the spherical head and the notch within the socket; and lug means carried by the plates extending into the notch of the head and less in thickness than the width of the notch whereby rotation of the second member relative to the first member is limited when the projections engage a member to be welded.

JOHN R. WIRT.

REFERENCES CITED

The following references are of record in the file of this patent:

UNITED STATES PATENTS

| Number | Name | Date |
|---|---|---|
| 935,346 | Winfield | Sept. 28, 1909 |
| 1,992,990 | Burns | Mar. 5, 1935 |
| 2,179,693 | Goldstein | Nov. 14, 1939 |
| 2,346,088 | Shobert | Apr. 4, 1944 |